Patented Nov. 14, 1939

2,180,008

UNITED STATES PATENT OFFICE 2,180,008

LUBRICATING OIL

Bert H. Lincoln and Waldo L. Steiner, Ponca City, Okla., and Alfred Henriksen, deceased, late of Ponca City, Okla., by Ellen M. Henriksen, administratrix, Ponca City, Okla., assignors, by mesne assignments, to The Lubri-Zol Development Corporation, Cleveland, Ohio, a corporation of Delaware No Drawing. Application July 5, 1934,
Serial No. 733,862

2 Claims. (Cl. 87—9)

Our invention relates to lubricating oils and more particularly to improved methods for the production of high quality lubricating oils and such products as new compositions of matter.

It is well known among petroleum technologists and mechanical technologists that mineral lubricating oils are dificient in oiliness characteristics and in extreme pressure characteristics, which are the most important characters of the lubricant when used under conditions of boundary lubrication, where the viscosity of the lubricant plays little or no part. Boundary lubrication conditions are obtained when engines are operating at heavy loads, low speeds, or if for any reason the supply of lubricant is cut off or not sufficient. This last condition may exist when for mechanical reasons the lubricant pump is not functioning properly or when the lubricant feed line is clogged with foreign matter. The present-day design of automotive as well as other mechanical devices call for greater loads on rubbing surfaces and the loads so imposed are too great for mineral lubricating oils. With lubricants of high load carrying capacity, designers of mechanical devices could design for greater loads on rubbing surfaces and obtain pronounced and definite economies in a number of ways.

Extreme pressure lubrication conditions are required for cutting oils and the like and it is well known that mineral lubricants are not satisfactory for this purpose.

The above described conditions are encountered with the very best quality and most highly refined lubricating oils. In some cases the more highly refined lubricants are weaker in extreme pressure characteristics.

The primary object of our invention is to provide lubricants of high oiliness and extreme pressure characteristics which will provide low coefficient of friction and which will allow of higher loads on rubbing surfaces during operation and will act as a safety factory in lubrication when abnormal conditions exist for one reason or another.

Another object of our invention is to provide a lubricant which will maintain a very low coefficient of friction and extreme pressure characteristics when diluted with light hydrocarbons such as are obtained in an automobile crank case by incomplete combustion of the fuel being burned in the engine.

A further object of our invention is to provide a lubricant having penetrative lubricity characteristics. It has been found that our lubricants do not drain off the rubbing surfaces when idle, thereby providing a lubricating film on the rubbing surfaces at all times and being of great value to the life of the machine in cold weather starting when the lubricant is very viscous and sluggish.

Still another object of our invention is to provide extreme pressure lubricants which may be used in metal cutting, severe lubricating conditions, and the like.

The method we have discovered and the lubricant prepared thereby for accomplishing the above objects consists broadly of adding halogenated aromatic hydroxy compounds to mineral hydrocarbon lubricants. We have found that the halogenated aromatic hydroxy compounds give a much higher load-carrying capacity and lower coefficient of friction when added to mineral lubricants than is obtained with the straight hydrocarbon lubricants. Another advantage is using the halogenated hydroxy aromatic hydrocarbons and their derivatives in lubricants is that such compounds may be used when an acid-free lubricant is required for one cause or another, such as in the presence of metals or alloys which corrode under conditions of use. Still another advantage obtained by most of the compounds covered in this invention is that they do not contain saponifiable glyceride or fatty acid which is objected to in the specifications of a number of the purchasers of lubricating oils.

The theory of our invention is not fully understood, but we assume that the halogenated aromatic hydroxy compounds and their derivatives have some physical and/or chemical action on the metal surfaces during use and thereby protect the metal during high temperature and high pressure operation.

In practicing our invention, relatively small quantities of the various halogenated aromatic hydroxy compounds and their derivatives are added to hydrocarbon lubricants. The added material is well blended with hydrocarbons and the mixture is ready for use. To prove the efficiency and value of the addition materials of our invention, we have tested them on the Timken testing machine to determine the increase in load-carrying capacity.

The Timken testing machine was developed and has been described by the Timken Roller Bearing Company. The machine consists of a rotating ring against which a block of metal may be pressured. The machine can be so controlled in its operation to give constant conditions of operation with the exception of the load, which may be increased until the lubricating film ruptures and allows metal-to-metal contact. The load at which the hydrocarbon lubricant film ruptures and allows metal-to-metal contact and seizure is reported as the load-carrying capacity of the lubricant under test.

Other tests and means may be used to demonstrate the efficiency of the lubricants covered in this invention. For example, the coefficient of friction of the lubricant blended with materials mentioned in this invention may be determined and the advantages noted. It is possible to determine the viscosity change and viscosity index of the base oil and the blended oil, as well as compare the oils on the basis of cold test or temperature at which the oil will set up and not flow. Other adventageous features could be pointed out, but the important characteristics of the lubricants of this invention are their greater load-carrying capacity or higher film strength.

A number of examples of our invention will be given to clarify the invention. In addition to the detailed examples given, other materials of particular value in our invention will be mentioned as satisfactory with certain comments on some of them. It is to be understood that our invention is not to be limited to any of the examples given.

*Example No. 1*

A good quality of S. A. E. 40 lubricant with a Timken film strength of 7,500 pounds per square inch was used for the base oil in this test. To this base oil was added one per cent of trichlorphenol and well mixed. The Timken film strength of this mixture was 37,500 pounds per square inch.

The trichlorphenol used in this experiment was prepared by direct chlorination of commercial phenol and the excess labile and/or free chlorine and hydrogen chloride removed from the solution by warming and air blowing. It is to be understood that commercial phenol and the product obtained by direct chlorination is entirely satisfactory for this invention, as is shown by the above enormous increase in film strength.

If mono and dichlorphenol is obtained by direct chlorination of the phenol or by other means, similar results are obtained, but larger quantities are required to obtain a given film strength improvement.

*Example No. 2*

A good quality S. A. E. 30 mineral lubricant of 6,500 pounds Timken film strength was used as a base oil in this test. To this base lubricant one per cent of trichlor resorcinol was added and well mixed. The Timken film strength on this mixture was 88,750 pounds per square inch. To another sample of the same S. A. E. 30 lubricant we added .25 per cent of trichlor resorcinol and the Timken film strength was 50,250 pounds per square inch.

The trichlor resorcinol used in this example was made by direct chlorination of commercially available resorcinol in an organic solvent. The halogenated product in the solvent was washed and air blown to remove the free chlorine and/or hydrogen chloride. The solvent was removed and the product used.

*Example No. 3*

Using another sample of the previously mentioned S. A. E. 30 lubricant, we added one per cent of dichloramylhydroquinone and after mixing well we determined the Timken film strength and obtained 20,000 pounds per square inch.

The amylhydroquinone used in this experiment was commercially available material and the dichlor product was obtained by direct chlorination.

*Example No. 4*

To another sample of the previously mentioned S. A. E. 30 hydrocarbon lubricant we added one per cent of the monomethylether of trichlor resorcinol and after mixing well we determined the Timken film strength and found it to be 33,000 pounds per square inch.

It is to be understood that the commercially pure trichlor resorcinol was converted into the monomethylether by one of the ordinary methods and that one free hydroxyl radical remained in the finished material.

*Example No. 5*

To another sample of the previously mentioned S. A. E. 30 lubricant we added one per cent of trichlor cresol and after mixing well determined the Timken film strength and found it to be 30,350 pounds per square inch.

The cresol used for halogenation in this example was of commercial purity and the trichlor product obtained by direct chlorination.

*Example No. 6*

To another sample of the previously mentioned S. A. E. 30 hydrocarbon lubricant we added one per cent of monochlorbenzylphenol and after mixing well determined the Timken film strength and found it to be 26,600 pounds per square inch.

Benzylphenol of commercial purity was used for direct chlorination to a monochlor product.

*Example No. 7*

To another sample of the previously mentioned S. A. E. 30 hydrocarbon lubricant we added one per cent of monochlororthotertiarybutylphenol and after mixing well we determined the Timken film strength and found it to be 26,700 pounds per square inch.

Commercially available orthotertiarybutylphenol was used for direct chlorination to the monochlor derivative and used in this example.

*Example No. 8*

To another sample of the previously mentioned S. A. E. 30 hydrocarbon lubricant we added one per cent of methyltrichlorphenylether and obtained a Timken film strength of only 9,750 pounds.

This ether was made by converting trichlorphenol into the methyl ether by substituting the hydroxyl hydrogen with the methyl group. It is obvious from this example that the hydroxy aromatic halogenated compounds are not effective if the hydroxyl groups are blocked.

We have found, however, that when a halogenated aromatic hydroxy compound containing more than one hydroxyl group is used we can convert one or more of the hydroxyl hydrogens into substitution products and still obtain the very desirable benefits in this one remaining hydroxyl hydrogen identifying the generic invention.

*Example No. 9*

The halogenated mono, di and tri hydric benzenes and their homologues are satisfactory for use in our invention when blended in small amounts with lubricants.

Example No. 10

Halogenated dihydroxy aromatic compounds are satisfactory for our invention after converting into the esters of various aliphatic and aromatic acids, provided at least one hydroxyl group remains on the benzene ring. The halogen may be attached to the ring and/or to the radical of the acid used in forming the ester.

Example No. 11

Halogenated hydroxy aromatic compounds of more than one hydroxyl group may be converted into the ether and be satisfactory in our invention if at least one hydroxyl remains on the benzene ring. The halogen may be attached to the benzene ring and/or the radical combined to form the ether. Any of the saturated or unsaturated aliphatic hydrocarbons and their isomeric compounds may be used in forming the ether of the halogenated hydroxy aromatic molecule.

Example No. 12

Ortho, meta and para ethyl phenois upon halogenation are satisfactory for blending with lubricating oils and use in our invention. The ortho, meta and para ethyl benzoyl hydroxy compounds may also be used in our invention after halogenation and blending with lubricating oils.

Example No. 13

The aromatic alcohols, such as benzyl alcohol, and their substitution products, after halogenation are satisfactory in our invention. The halogen may be attached to the benzene ring or attached to the side chain.

Example No. 14

The cresols are very satisfactory after halogenation and/or substitution and are very valuable in our invention due to their availability in commercial quantities. The ortho, meta, and para cresols have all been found satisfactory after halogenation for use in our invention.

Example No. 15

Catechol after halogenation and blending in small amounts with hydrocarbon lubricants has proved satisfactory in our invention. Dichlor catechol in S. A. E. 30 lubricant in the amount of 1% gave a Timken film strength of 51,000 pounds per square inch.

Example No. 16

Pyrogallol and phloroglucinol after halogenation and blending with lubricating oil may be used in our invention.

Example No. 17

Thymol and carvacrol and similar type compounds after halogenation may be blended with hydrocarbon lubricants and used in our invention.

Example No. 18

Dichlorquinone was added to a hydrocarbon oil having a S. A. E. viscosity of 30, in the amount of one-half of one per cent by volume. The resulting mixture had a film strength of 20,000 pounds.

Example No. 19

One-half of one per cent of dichlorufigallol was added to the same S. A. E. 30 hydrocarbon oil, and the resulting mixture had a film strength of 11,000 pounds.

It is obvious from the above examples that the hydroxy aromatic compounds after halogenation are satisfactory for use in our invention.

The degree of halogenation may be varied over wide limits, depending upon the type of aromatic compound being halogenated and the results desired when blended with lubricating oil. The percentage of halogen may vary from 5 per cent by weight to as much as 60 per cent by weight, or more.

In the above examples chlorine has been used, however, it should be understood that the other halogens, such as fluorine, bromine and iodine may also be used within our invention. Fluorine is somewhat active and bromine and iodine are very expensive; therefore chlorine is of greater commercial utility.

Various means of refining the halogenated hydroxy aromatic compounds may be used. In some instances it is necessary to distill by vacuum and/or steam to remove the desired material from the reaction mixture. In other cases washing with certain organic solvents and/or mild oxidizing or reducing agents will give the desired results. The free hydrogen chloride and/or chlorine formed during the halogenation of the compound should be removed prior to use in our invention.

Varying percentages of the halogenated hydroxy containing aromatic compounds may be blended with lubricating oil, depending upon the degree of film strength improvement desired, as well as the characteristics of the compound being used. The percentage by volume may vary from .1 per cent, or slightly lower, to as much as 60 per cent or more.

In the examples given, the materials of our invention were added to lubricants of S. A. E. 30 and S. A. E. 40 specifications. Our materials give the advantageous results in all lubricants, regardless of classification and may be used in lubricants generally, including synthetic and hydrogenated lubricants. In greases, small amounts of these materials greatly improve film strength.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. A lubricant comprising in combination a suitable lubricating oil base and halogenated resorcinol.

2. A lubricant comprising in combination a suitable lubricating oil base and chlorinated resorcinol.

BERT H. LINCOLN.
WALDO L. STEINER.
ELLEN M. HENRIKSEN,
*Administratrix for the Estate of Alfred Henriksen, Deceased.*